United States Patent [19]

Schumacher

[11] Patent Number: 4,465,114

[45] Date of Patent: Aug. 14, 1984

[54] WOODWORKING BENCH

[76] Inventor: Robert C. Schumacher, 112 N. Main St., Jefferson, Wis. 53549

[21] Appl. No.: 412,114

[22] Filed: Aug. 27, 1982

[51] Int. Cl.³ ............................ B25H 1/02; B27C 5/10
[52] U.S. Cl. .................................. 144/286 R; 83/574; 108/8; 108/113; 144/1 R
[58] Field of Search .............. 144/1 R, 1 C, 1 F, 3 R, 144/134 R, 136 R, 286 R, 287; 83/574

[56] References Cited

U.S. PATENT DOCUMENTS

| | | | |
|---|---|---|---|
| 2,630,147 | 3/1953 | Garberg | 83/574 |
| 4,133,360 | 1/1979 | Sanfilippo et al. | 144/286 R |
| 4,161,974 | 7/1979 | Patterson | 144/287 |
| 4,265,283 | 5/1981 | Nash et al. | 144/286 R |

FOREIGN PATENT DOCUMENTS 2617800  5/1976  Fed. Rep. of Germany ... 144/286 R

*Primary Examiner*—W. D. Bray
*Attorney, Agent, or Firm*—Andrus, Sceales, Starke & Sawall

[57] ABSTRACT

A woodworking bench for the precision cutting of workpieces includes a table top pivotally mounted on a frame and a saw support assembly mounted on one side of the table top. The support assembly includes a pair of guide arms for slidably receiving a portable circular power saw so that the saw blade may be moved across the workpiece to operate as a radial saw. The guide arms are pivotally mounted about a vertical axis in a cantilevered construction so that miter cuts may be made, and the arms may be moved up and down to vary the depth of the cut of the saw blade. A saw lock for locking the saw in a fixed position on the guide arms is also provided so that the table top may be flipped and converted to a table saw whereby a workpiece may be moved across the blade.

9 Claims, 7 Drawing Figures

WOODWORKING BENCH

BACKGROUND OF THE INVENTION

The present invention relates to woodworking, and more particularly to a workbench which has the features of both a radial saw and a table saw.

Various types of workbenches are known in the art having fixtures attached thereon which are utilized in connection with power tools to provide multiple woodworking operations. See for example, U.S. Pat. Nos. 4,105,055 and 3,734,151. In particular, the workbenches disclosed in each of the above referred to patents may be convertible to operate either as a radial saw or a table saw. Other types of benches which also utilize various power tools are shown in U.S. Pat. Nos. 4,318,432 and 4,114,665. It is thus desirable to provide a multi-purpose workbench capable of utilizing various power tools for woodworking operations.

SUMMARY OF THE INVENTION

A woodworking bench for precision cutting of workpieces. The workbench includes a flat table top mounted on a frame and a support means mounted on one side of the table top for supporting a portable circular power saw. The table top is selectively movable between a first position wherein one side provides a top working surface to operate as a radial saw and a second position wherein the other side provides the top work surface to operate as a table saw.

The saw support means includes a guide means for slidably guiding the saw so that the saw blade moves across a workpiece when the top is in its first position and operating as a radial saw. The guide means includes a pair of adjacent, spaced apart arms which form a slot for receiving the saw blade. The arms are mounted in a contilevered construction and are pivotable about a substantially vertical axis so that miter cuts in a workpiece may be made. The support means further includes adjusting means for moving the arms up and down relative to the table top to vary the depth of the cut of the blade.

The saw support means also includes a saw lock means for locking the saw in a fixed position on the guide arms. In this locked position the saw blade projects through an opening in the table top so that a workpiece may be moved across the blade for ripping operations when the table top is in its second position operating as a table saw.

The table top is pivotally mounted on the frame and the pivotal connection includes a pair of pins extending between the frame and the table top which are positioned intermediate the ends of opposite sides of the table top. Table securing means are provided for releasably securing the table top in the frame. Thus, in order to convert the workbench from a radial saw to a table saw or vice versa, the table securing means is released and the table top is pivoted or flipped 180° and then once again locked in place by the securing means.

When a workpiece is positioned for cutting the guide arms may be lowered by the adjusting means to bear against the workpiece so that the arms act as a vice to securely hold the workpiece in place. Lever means is also provided at the free end of said arms to which a manual force may be applied to lift or flex the arms and allow for quick and easy insertion and removal of the workpiece.

The present invention thus provides an improved workbench which includes several fixtures used in connection with a circular power saw to provide a multi-use woodworking bench.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
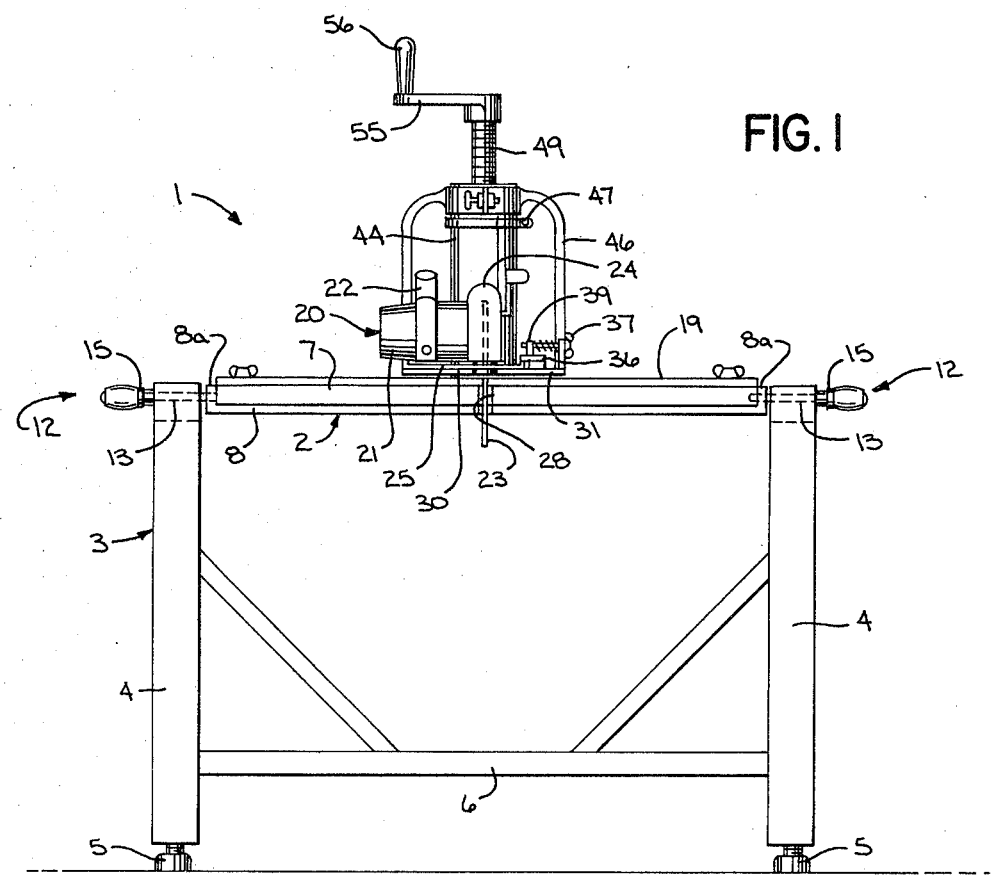
FIG. 1 is a front view in elevation of a workbench constructed in accordance with the principles of the present invention.
Figure 2:
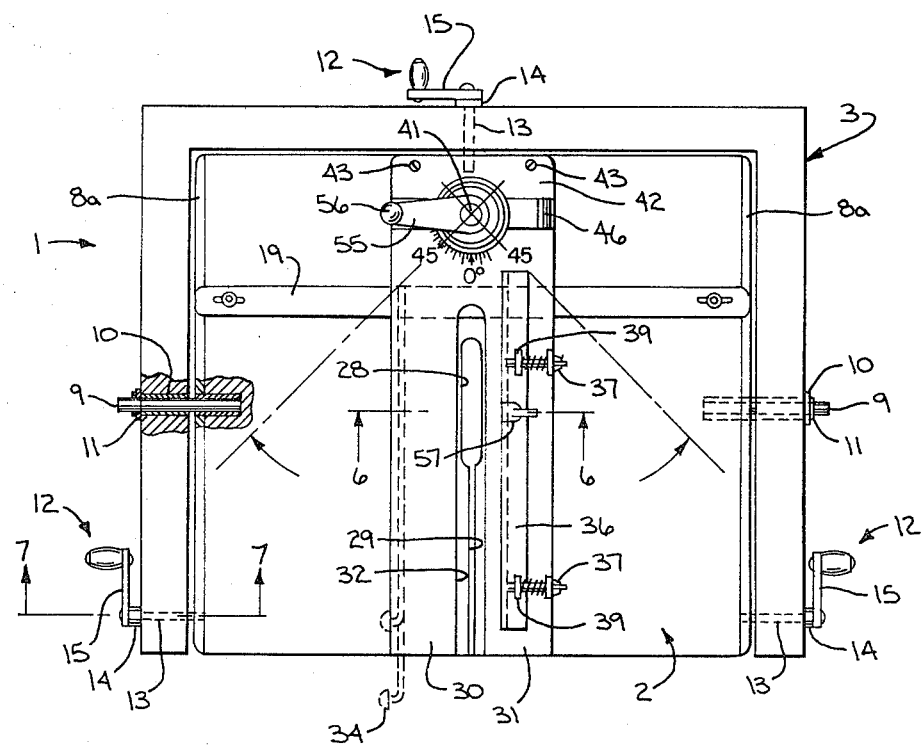
FIG. 2 is a top plan view with parts broken away and in section of the workbench of FIG. 1 set up to operate as a radial saw.

Referring now to the drawings, FIGS. 1 and 2 illustrate a workbench designated by the numeral 1 constituting the preferred embodiment of the present invention. The workbench 1 includes a table top 2 mounted in a frame 3 which is supported by vertical legs 4. The frame 3 is U-shaped having a pair of opposite side members interconnected by an end member. The legs 4 each include a conventional threaded level adjuster 5 which may be utilized to level the table top 2 in a substantially horizontal position. A cross-brace 6 extends between each pair of adjacent legs 4 to provide added support and stability for the workbench 1.

Figure 3:
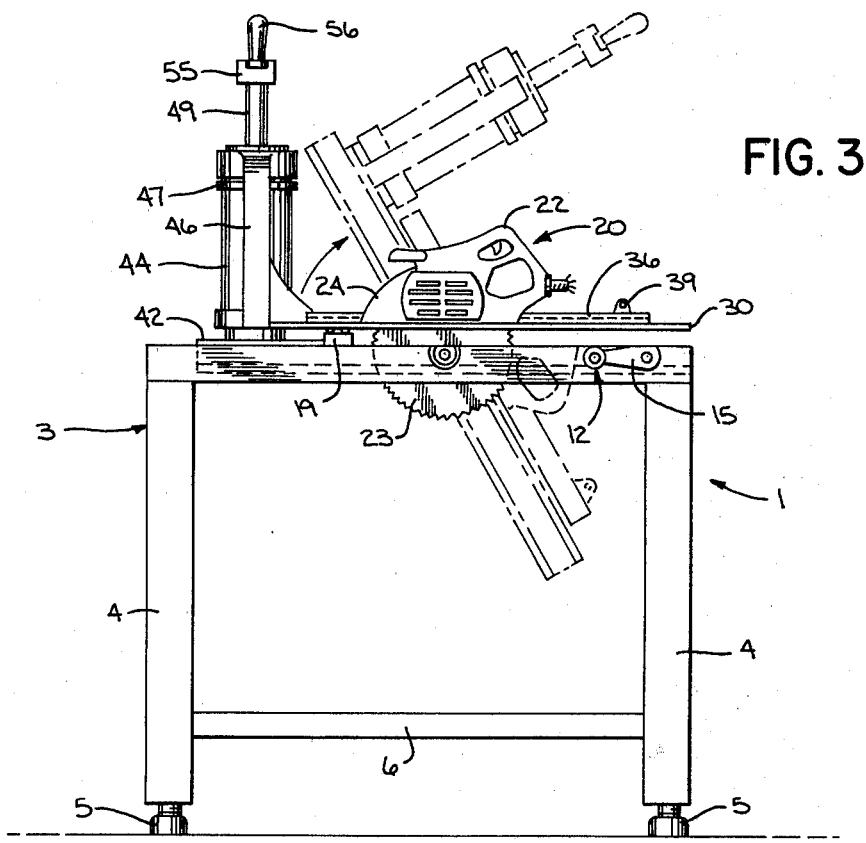
FIG. 3 is a side view in elevation of the workbench of FIG. 1 showing in phantom the operation of flipping the table top.
Figure 4:
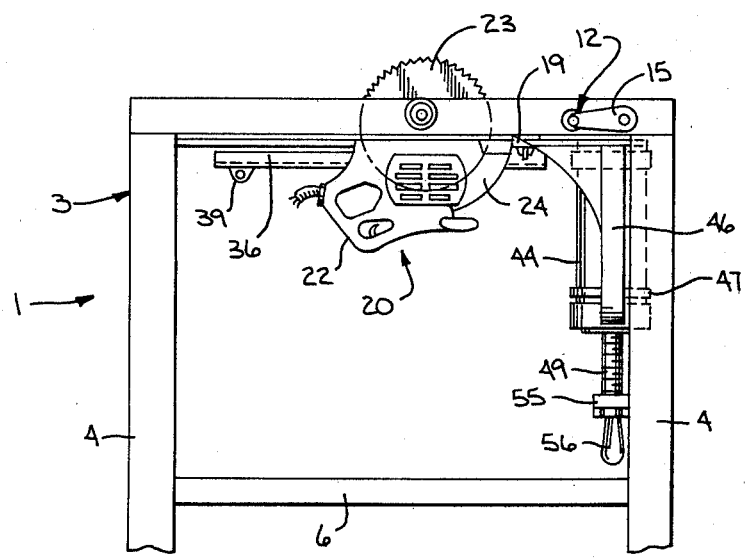
FIG. 4 is a side view in elevation similar to FIG. 3 showing the workbench converted to a table saw.
Figure 7:
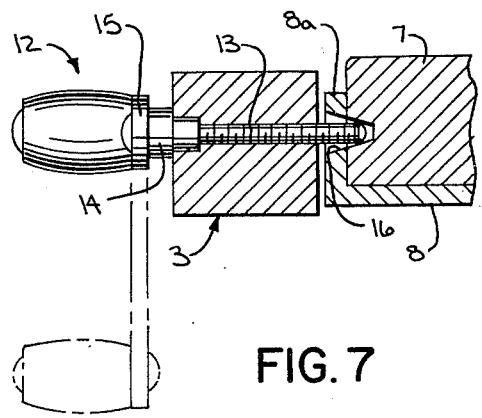
FIG. 7 is a view in cross section taken along the plane of line 7—7 of FIG. 2.

The table top 2 is rectangular in shape and includes a flat wooden board 7 received within a recess of a metal channel-shaped member 8 (FIG. 7). The two upright lips 8a of member 8 correspond to the two sides of frame 3, as seen best in FIG. 2. The exposed side of board 7 provides a planar top work surface when the workbench 1 is utilized as a radial saw (FIGS. 1 and 2), and the exposed side of member 8 provides the top work surface when table top 2 is flipped for use as a table saw (FIGS. 3 and 4). Table top 2 is pivotally mounted on frame 3 to provide for the flipping movement referred to above. The pivotal connection of table top 2 to frame 3 is shown in FIG. 2 and includes a pair of pins 9 extending between the side members of frame 3 and the side edges of table top 2. The pins 9 are coaxially positioned intermediate the ends of opposite sides of table top 2, and are mounted within sleeve bearings 10. Pins 9 are secured in place by means of a lock washer 11.

As shown best in FIGS. 2 and 7, table top 2 is secured in its horizontal position by means of three crank locks 12. Each crank lock 12 includes a threaded pin 13 supported by a bearing 14 in frame 3 and a crank arm 15 for turning pin 13. A tapered bore 16 is formed in the side edges of member 8 and board 7 and is of sufficient dimensions to receive the tip of pin 13 so that when crank arm 15 is turned in one direction pin 13 extends into bore 16 to lock table top 2 in its horizontal position. Likewise, to unlock table top 2 crank arm 15 is rotated in the opposite direction so that the end of pin 13 moves out of bore 16 to enable table top 2 to be pivoted or flipped 180° on pivot pins 9, as illustrated in phantom in FIG. 3. Table top 2 also includes a guide fence 19 mounted on board 7 and extending across the width thereof. Guide fence 19 is utilized in the conventional manner to provide a straight edge abutment for a workpiece during cutting operations.

A portable circular power saw 20 may be utilized with workbench 1. The saw 20 is of conventional design and includes a motor housing 21, hand grip 22, a rotating circular cutting blade 23 and blade guard 24. As seen best in FIG. 6, saw 20 also includes a flat guide runner 25 which is disposed normal to the plane of blade 23 so that blade 23 is properly oriented when cutting a work piece. Guide runner 25 also includes a central opening 26 for receiving blade 23 and a notch 27 formed therein adjacent blade 23, as is conventional.

The blade 23 of saw 20 projects through a central opening 28 formed in table top 2 through board 7 and member 8 when positioned for use as a table saw (FIG. 4). Board 7 further includes a narrow slot 29 formed therein communicating between the front edge of table top 2 and opening 28.

As a means for supporting circular saw 20 workbench 1 includes a pair of adjacent, spaced apart guide arms 30 and 31 which form a longitudinal slot 32 for receiving the saw blade 23. As seen best in FIG. 6, arms 30 and 31 are each comprised of thin, flat metal plates which are mounted in a cantilevered manner (FIG. 3) on a head assembly which will hereinafter be described. Guide arm 30 includes a channel 33 along its left outer edge extending substantially parallel to slot 32. Channel 33 is integrally formed in arm 30 and is adapted to slidably receive the left side edge of guide runner 25 of saw 20, as shown best in FIG. 6. Arm 30 also includes a lever 34 mounted thereon for sliding movement in its longitudinal direction. When extended lever 34 may be grasped by an operator and lifted upwardly to flex the free ends of arms 30 and 31. This flexing allows for easy and quick insertion and removal of a workpiece.

Figure 6:
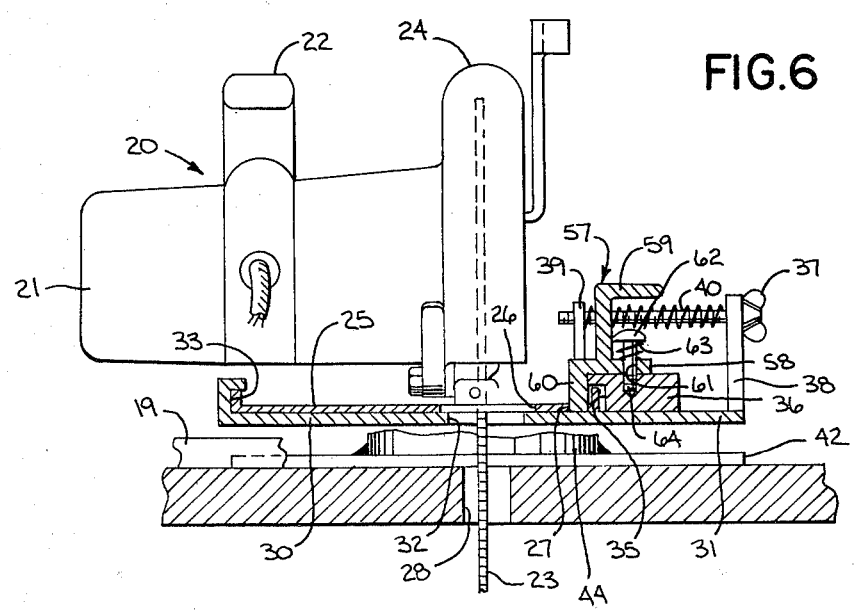
FIG. 6 is a view in cross section taken along the plane of the line 6—6 of FIG. 2 illustrating the power saw thereon.

Guide arm 31 also includes a channel 35 for receiving the right side edge of guide runner 25. Channel 35 is provided by a fence 36 which extends substantially the entire length of the arm 31 and is positioned parallel to slot 32. The position of channel 35 may be moved relative to slot 32 by means of a pair of adjusting screws 37. Adjusting screws 37 extend between an upright flange 38 formed on the right edge of guide arm 31 and an upright lug 39 formed on fence 36. A spring 40 extends between flange 38 and lug 39 to bias fence 36 to the left as seen in FIG. 6. Thus, when screw 37 is rotated in one direction or the other the fence 36 will slide along arm 31 to move the position of channel 35 either closer to or further away from slot 32 to properly locate guide runner 25 therein.

As shown best in FIG. 2, arms 30 and 31 are pivotally mounted about a substantially vertical axis 41 so that a workpiece may be cut at an angle by saw 20. As shown, arms 30 and 31 may be rotated up to 45° to provide miter cuts in the workpieces. The inner ends of guide arms 30 and 31 are secured to the head assembly which provides the pivotal connection, as will hereinafter be more fully described.

Figure 5:
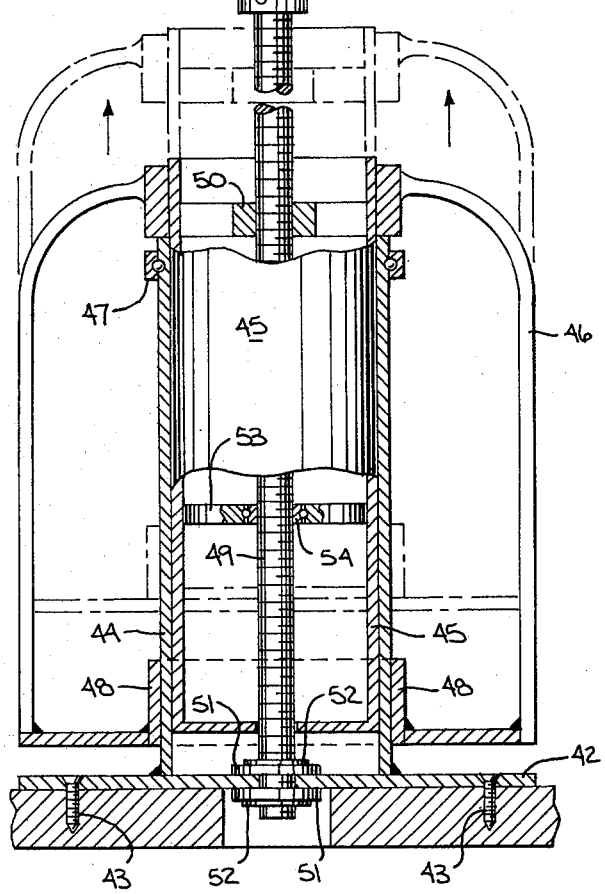
FIG. 5 is a view in cross section of the head assembly for the workbench showing the manner in which it adjusts the height of the saw blade.

As shown best in FIG. 5, the head assembly includes a mounting plate 42 secured to board 18 by screws 43, an upstanding outer cylindrical sleeve member 44 welded to plate 42, an inner cylindrical sleeve member 45 movable within sleeve 44 and an outer casing 46 attached to the upper end of sleeve 45. The outer diameter of sleeve 45 is substantially the same as the inner diameter of sleeve 44 so that sleeve 45 is in telescoping relation with sleeve 44 and may be slid therein. The friction between the sleeves 44 and 45 may be adjusted by means of an adjusting strap 47 which encircles the upper end of sleeve 44. The upper end of casing 46 is connected to the upper end of sleeve 45 and the lower end of casing 46 is welded to the inner ends of guide arms 30 and 31. The lower end of casing 46 has an upturned flange 48 which is in sliding engagement with the outer surface of sleeve 44 as shown in FIG. 5.

The head assembly also includes an upstanding threaded rod 49 positioned substantially along vertical axis 41 so that sleeves 44 and 45 are concentric therewith. Rod 49 is threadedly engaged with a web member 50 within the upper end of sleeve 45. The lower end of rod 49 is secured to plate 42 by means of a thrust washer 51 and snap ring 52 disposed on either side thereof. Rod 49 is supported centrally by means of a disc plate 53 within sleeve 45. A bearing member 54 is positioned between rod 49 and plate 53 which permits the rod to rotate with respect to plate 53. A crank arm 55 is connected to the upper end of rod 49 and includes a handle 56 for an operator. Thus, when rod 49 is rotated in one direction its threaded connection with web 50 causes inner sleeve 45 and outer casing 46 to move upwardly as shown in phantom in FIG. 5. This in turn causes guide arms 30 and 31 to be raised upwardly from the surface of board 7 of table top 2. When rod 49 is rotated in the opposite direction sleeve 45 and casing 46 as well as guide arms 30 and 31 move downwardly. This downward movement can be utilized by the operator to apply a force against a workpiece positioned between arms 30 and 31 and board 7 so that the arms 30 and 31 may act as a vice to securely hold the workpiece. Thus, the head assembly provides not only an adjusting means for varying the distance between the arms 30 and 31 and board 7 to adjust the depth of the cut of saw blade 23, but also provides the pivotal connection for guide arms 30 and 31 since arms 30 and 31 are connected to outer casing 46 which may be rotated with respect to the stationary sleeve 44.

The saw support means further includes a saw lock means for locking the saw 20 in a fixed position on guide arms 30 and 31. As seen best in FIG. 6, the saw lock means ncludes a latch 57 having a base 58, a handle 59 and a projecting finger portion 60. The handle 59 is L-shaped and extends upwardly from base 58 while finger 60 extends downwardly from the front edge of base 58 to engage notch 27 in the guide runner 25 of saw 20. The rear portion of base 58 includes an opening 61 through which a bolt 62 extends. A spring 63 extends between the head of bolt 62 and base 58. When assembled in its locking position, bolt 62 is threadedly engaged in a threaded bore 64 formed in fence 36 and finger 60 projects into the notch 27 in guide runner 26. Spring 63 biases base 58 of latch 57 against the top surface of fence 36 to secure latch 57 in its locking position so that the saw 20 cannot be slid longitudinally along guide arms 30 and 31. In order to unlock the saw 20, an operator merely grasps the handle 59 and lifts upwardly against the spring force of spring 63 so that finger 60 becomes disengaged from notch 27 and then rotates latch 57 out of the way. Once unlocked, saw 20 may once again be slid along guide arms 30 and 31.

In operation, when the workbench 1 is assembled in accordance with FIGS. 1 and 2, power saw 20 may be used as a radial saw whereby blade 23 moves over the workpiece to perform cutting operations. If it is desired to make a miter cut in a workpiece, arms 30 and 31 are merely rotated to the desired angle prior to moving the saw blade 23 over the workpiece. Further, if it is desired to adjust or vary the depth of the cut of saw blade 23 crank arm 55 is rotated to move the arms 30 and 31 upwardly or downwardly as desired. Once the workpiece is properly positioned between arms 30 and 31 and board 7, the crank arm 55 may be rotated in the opposite direction to lower arms 30 and 31 against the workpiece to secure the workpiece in place. After saw 20 cuts the workpiece the workpiece may be removed by either rotating crank 55 to lift arms 30 and 31, or by grasping the lever 34 extending from arm 30 to flex the free ends of arms 30 and 31 upwardly. This flexing releases the pressure applied by arms 30 and 31 against the workpiece so that the workpiece may be quickly and easily removed. Another workpiece may then be inserted in the same manner if desired.

When it is desired to utilize the workbench 1 as a table saw, as in the case or ripping a large flat workpiece, the table top 2 need only be flipped 180° so that the surface member 8 now becomes the work surface. In order to accomplish this flipping operation, the saw 20 is moved on arms 30 and 31 until its blade 23 is positioned over opening 28 in table top 2. Saw 20 is then locked in this position by inserting the finger 60 of latch 57 into the notch 27 in runner 25. The cranks 15 of locks 12 are then rotated to withdraw pins 13 from the bores 16 in the sides of table top 2. Once the table top 2 is unlocked it may be pivoted on pins 9 as shown in FIG. 3 so that the blade 23 projects upwardly through opening 28. To once again lock table top 2 in its horizontal position, pins 13 of locks 12 are turned into bores 16. In this position the workbench 1 operates as a table saw whereby a workpiece may be moved across the blade 23 of saw 20 for ripping operations. While in the position shown in FIG. 4, the position of blade 23 may be adjusted in the same manner as previously described by merely rotating crank arm 55 to move the arms 30 and 31 up or down.

A woodworking bench has been shown and described which provides an improved versatile workbench. It is readily obvious to those skilled in the art, however, that various modifications and/or substitutions of components may be made to those specifically illustrated and described. For example, various saw lock means may be utilized as well as various types of head assemblies for mounting guide arms 30 and 31 to table 2. It should also be noted that although specifically described with respect to a circular saw the workbench 1 of the present invention may also be utilized with a router or other power tool.

Various modes of carrying out the invention are presently contemplated as being within the scope of the following claims particularly pointing out and distinctly claiming the subject matter which is regarded as the invention.

I claim:

1. A woodworking bench for precision cutting of wooden workpieces, comprising:
   a frame;
   a table top mounted on the frame and having a pair of opposing flat surfaces, said table top being selectively movable between a first position wherein one of said surfaces provides a top work surface and a second position wherein the other of said surfaces provides the top work surface;
   a saw support means mounted on said one surface which includes guide means for slidably guiding a portable circular power saw so that the saw blade may move across a workpiece when said table top is in said first position, and saw lock means for locking said saw in a fixed position on said guide means wherein the saw blade projects through an opening in said table top so that a workpiece may be moved along said other surface across the blade when the table top is in said second position; and
   table securing means for releasably securing the table top to said frame.

2. The woodworking bench of claim 1 wherein saidtable top is pivotally mounted on said frame.

3. The woodworking bench of claim 2, wherein the pivotal connection of said table top to said frame includes a pair of pins extending between said frame and said table top which are coaxially positioned intermediate the ends of opposite sides of said table top.

4. The woodworking bench of claim 1, wherein said guide means is pivotally mounted about a substantially vertical axis so that a workpiece may be cut at an angle by said saw when in said first position.

5. The woodworking bench of claim 1, wherein said saw support means further includes adjusting means for varying the distance between said guide means and said one surface to adjust the depth of the cut of the saw blade.

6. The woodworking bench of claim 1, wherein said guide means includes a pair of adjacent, spaced apart arms which form a slot for receiving the saw blade.

7. The woodworking bench of claim 6, wherein said arms are mounted in a cantilevered manner and extend across said table top.

8. The woodworking bench of claim 7, further including lever means at the free end of one of said arms to which a manual force may be applied to flex the free ends of said arms and allow for insertion and removal of a workpiece.

9. The woodworking bench of claim 6, wherein said arms include a pair of channels extending substantially parallel to said slot and disposed on either side thereon, said channels adapted to slidably receive the guide runner of a saw.

* * * * *